US005449023A

United States Patent [19]

Cleland et al.

[11] Patent Number: 5,449,023

[45] Date of Patent: Sep. 12, 1995

[54] MULTI-FLUID FLOW CONTROL DEVICE

[75] Inventors: Robert K. Cleland, Los Alamitos, Calif.; William C. Boettcher, Foley, Mo.

[73] Assignee: Robert L. Cleland, Los Alamitos, Calif.

[21] Appl. No.: 289,543

[22] Filed: Aug. 12, 1994

[51] Int. Cl.[6] .............................................. F16K 11/14

[52] U.S. Cl. .................................... 137/597; 137/607; 137/625.48; 137/630.22

[58] Field of Search ........... 137/597, 607, 595, 625.49, 137/625.5, 630.2, 630.22, 625.46

[56] References Cited

U.S. PATENT DOCUMENTS

| | | | |
|---|---|---|---|
| 922,017 | 5/1909 | Milke | 137/625.5 X |
| 1,391,676 | 9/1921 | Finley | 137/597 X |
| 2,416,581 | 2/1947 | Harr | 137/607 X |
| 2,578,543 | 12/1951 | Harr | 137/607 X |
| 3,720,233 | 3/1973 | Shur et al. | 137/597 X |
| 3,921,665 | 11/1975 | Lebzelter | 137/630.22 X |
| 4,501,288 | 2/1985 | Field | 137/625.48 X |
| 4,579,143 | 4/1986 | Rollins et al. | 137/597 X |

*Primary Examiner*—Stephen M. Hepperle

*Attorney, Agent, or Firm*—Georges A. Maxwell

[57] ABSTRACT

A multi-fluid flow control device comprising an elongate horizontal body with front and rear ends, a fluid-conducting chamber in the rear end portion of the body, fluid inlet and outlet openings communicating with the chamber, an elongate bore in the body between the chamber and the front end thereof, and, water inlet and outlet ports communicating with the bore; an elongate valve part with front and rear ends and a transverse water transfer passage with laterally opening upstream and downstream ends and slidably engaged in the bore and shiftable longitudinally therein from a rear position where the upstream and downstream ends of the passage register with the inlet and outlet ports to direct water entering the inlet port out through the outlet port and a forward position where said ends of the passage are out of register with said ports and water entering the inlet port is directed rearwardly through the bore in and into the chamber; a central opening in the valve part between the front end thereof and the passage therein, an elongate valve stem with front and rear ends threadedly engaged in the central opening and having a valve head at its rear end to enter the passage and a manually engageable operating knob at its rear end.

8 Claims, 3 Drawing Sheets

C
20
28
U
30
M
31
32
20
76
2
22
23
40
86
29'
P
29
2
53
D
V
W
22
23
D 27
48
26
25
94
24
49
52
75
76
81
77
82
84
42
46
88
87
92
43
83
91
93
45
41
44
73
80
51
71
55
72
40
70
86

MULTI-FLUID FLOW CONTROL DEVICE

BACKGROUND OF THE INVENTION

The multi-fluid flow control device of the present invention is particularly suited for use in fluid handling-beverage dispensing apparatus or machines.

In the art of making and dispensing beverages, such as fruit-flavored ades or punches, it is common practice to make beverages by mixing together predetermined volumes of sugar-ladened beverage concentrates with predetermined volumes of water. The sugar-ladened concentrates are commercially produced and are intended to be mixed with predetermined volumes of water to produce proper and vendable beverages. In most instances, the ratio of water and concentrate is variable, within reasonable limits, to produce "light" to "heavy" beverages.

In practice, it is necessary for the users of concentrates to adjust their beverage handling machines so that properly metered volumes of water are caused to combine with the concentrates that are used. Accordingly, with possible rare exception, beverage making and dispensing machines that operate to mix water and beverage concentrates to establish beverages to be dispensed include manually adjustable water metering valve means to adjust and set the volume of water that is caused to combine with the beverage concentrates flowing through the machines, the volumetric flow of which is suitably and accurately controlled. The manually adjustable metering valve means used throughout the art are selected from a multitude of commercially available valves, etc., that are often quite costly, troublesome to use and of questionable serviceability in the environments they are placed.

In the past, the producers of beverage concentrates packaged and distributed concentrates in glass bottles or jugs and in tin cans. Those containers usually ranged in size between one gallon and five gallons. Due to inherent inconveniences and difficulties encountered in handling and using such packaging means, the producers of beverage concentrates and the manufacturers of beverage handling equipment have continuously sought to improve and make easier and more-convenient-to-use beverage concentrate packages and machines.

In the beverage dispensing art, the overwhelming majority of those who make and dispense beverages established of concentrate and water, utilize beverage dispensing machines that can be effectively and economically supplied with beverage concentrates packaged in small containers that range in size from about 1 to 3 gallons and such that the handling and storing of the containers present no major problems. To this end, the industry now provides counter top beverage dispensing machines that conveniently accommodate concentrate containers ranging from 1 to 3 gallons in size. Those containers are commonly formed of "blown plastic" and are shaped and contoured to most effectively utilize space within and about the beverage dispensing machines with which they are to be related.

In furtherance of the foregoing, many beverage dispensing machines now being produced are equipped with beverage concentrate conducting parts or fittings with upwardly opening cylindrical sockets into which pouring spouts provided on concentrate containers can be engaged to supply concentrates to the machines. The depending dispensing spouts have O-rings about their exteriors, to enter and seal in the sockets provided therefor. Still further, the dispensing spouts are provided with normally closed check valves at their outlet ends to normally prevent concentrate from flowing out through the spouts. The spout-receiving sockets are provided with central posts that engage and unseat the valve members of the check valves, to open the valves, when the spouts are fully engaged in the sockets.

Due to the great tendency for bacteria to grow in and about beverage making and dispensing machines, regular flushing and cleaning of such machines is mandated by strictly enforced Codes and by good practices. In the case of beverage making and dispensing machines of the general class noted above, both Codes and good practices require that those parts and portions of beverage handling equipment through which sugar-ladened concentrates flow be thoroughly flushed and cleaned of sugar-ladened materials at least once a day and/or that they be flushed and cleaned whenever they are put out of service for a period of time that is sufficient to enable bacteria to commence to colonize. For example, when a machine is put out of service overnight (from one work day to another), it must be flushed and cleaned before being put to rest.

In the case of those beverage making and dispensing machines, in which containers of concentrate are directly connected with the machines, the containers must be disconnected and removed from the machines to effect flushing and cleaning them, and the machines must be provided with and include costly and oftentimes complicated flushing and cleaning systems, including flow lines, manifolds and valves that must be operated in prescribed manner to effect removal of the containers; effect flushing and cleaning of the machines; and effect re-engagement of the containers. In addition to being costly to make and maintain, the flushing and cleaning systems for machines are often so complicated and inconvenient to use that those whose responsibility it is to effect flushing and cleaning the machines all too often shirk that responsibility.

As a result of the foregoing, there has been a recognized need and want for improved means to effect flushing and cleaning of beverage making and dispensing machines of the class referred to in the foregoing that enables the machines to be flushed and cleaned without having to provide separate costly and complicated flushing and cleaning systems and that do not require that the concentrate containers be disconnected and removed from the machines to effect flushing and cleaning thereof. Still further, there is an existing and recognized need to provide improved means for adjusting the rate of flow of water into and through such machines that does not require the adoption and use of costly, space-consuming and difficult to install and maintain water metering means.

OBJECTS AND FEATURES OF OUR INVENTION

It is an object of our invention to provide a novel multi-fluid flow control device for beverage making and dispensing machines which is such that it enables the machines to be flushed and cleaned of sugar-laden material by manual push-pull movement of a single valve part.

Another object of the invention is to provide a new and improved unitary multi-fluid flow control device including co-related valve means to selectively direct water entering the device into a related machine to make beverage or to flush and clean the device and the machine and that is operable to adjust the volume of flow of water that is directed to make beverage.

It is an object and feature of our invention to provide a multi-fluid flow control device of the general character referred to above including a body with a liquid concentrate (liquid) conducting chamber, liquid inlet and outlet openings communicating with the chamber, water inlet and outlet ports, a bore within the body with which the chamber and inlet and outlet ports communicate and a valve part in the bore and moveable to selectively direct water entering the inlet port to the chamber or to the outlet port.

Yet another object and feature of our invention is to provide a novel multi-fluid flow control device of the general character referred to above wherein the valve part has a water conducting flow passage with inlet and outlet ends that are moveable into and out of register with the water inlet and outlet ports and a valve part that carries a secondary valving part that is moveable into and out of engagement in the passage to adjust the volume of water that flows through the passage.

Still another object and feature of the present invention is to provide a novel multi-fluid flow control device of the general character referred to above wherein a normally closed check valve is related to the inlet opening to the chamber to normally prevent the flow of liquid into the chamber and wherein the device includes check valve actuating means acting between the check valve and the first valve part that opens the check valve when the first valve part is positioned to direct water from the inlet port to the outlet port.

Finally, it is an object and feature of the invention to provide a multi-fluid flow control device of the general character referred to above that is small, neat and compact; includes a minimum number of easy and economical to make and assemble parts; that is extremely easy and convenient to use; and, that is sufficiently rugged and durable to withstand the most severe use and abuse the device is likely to be subjected to when put to its intended use.

The foregoing and other objects and features of our invention will be apparent and will be fully understood from the following detailed description of typical preferred forms and applications of our invention throughout which description reference is made to the accompanying drawings.

DETAILED DESCRIPTION OF THE INVENTION

Figures 1, 2:
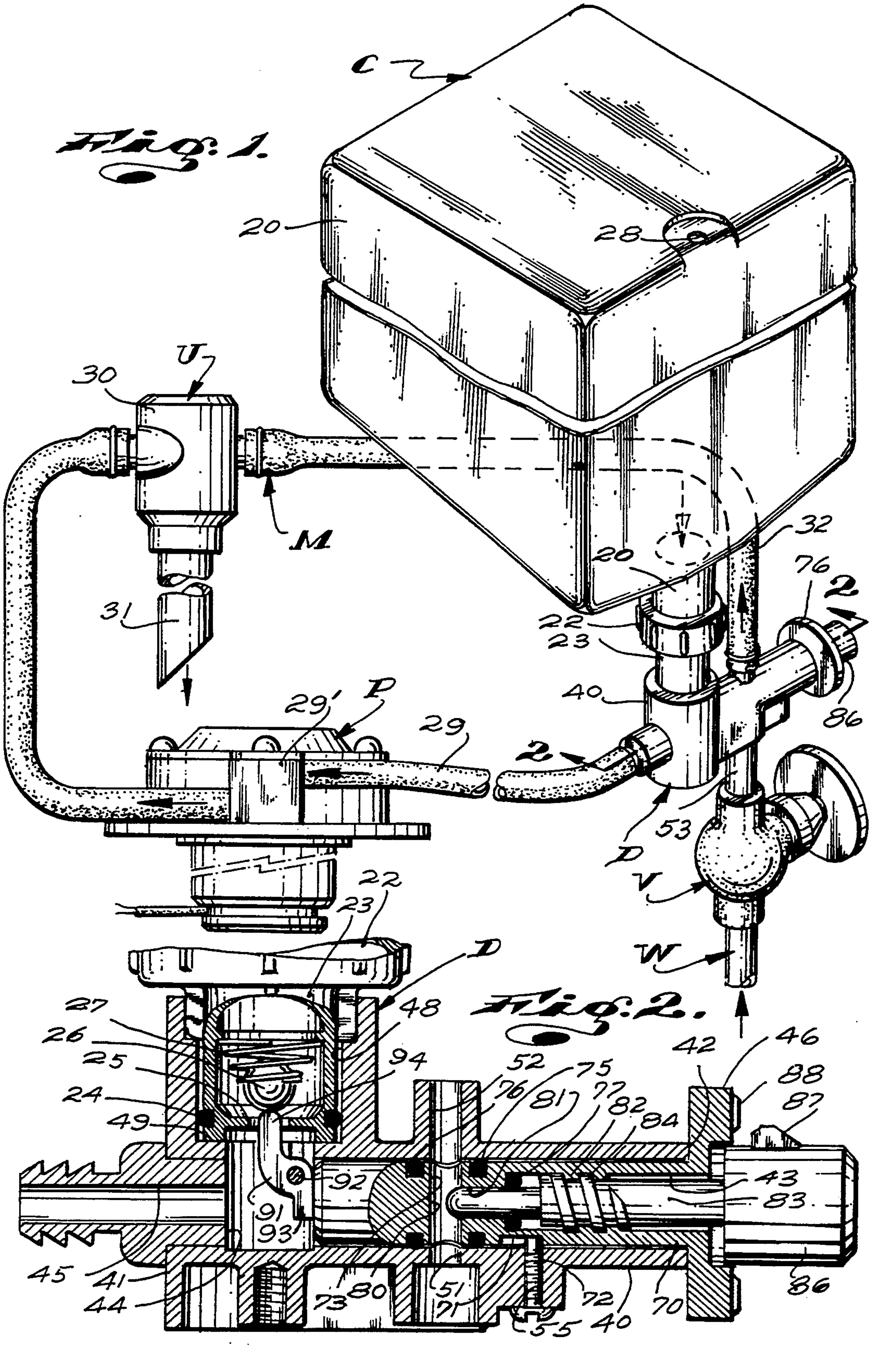
FIG. 1 is a diagrammatic view showing our new multi-fluid flow control device cooperatively related to parts of a beverage dispensing machine.
FIG. 2 is an enlarged detailed sectional view of the device taken substantially as indicated by Line 2—2 on FIG. 1.

In FIG. 1 of the drawings, our new multi-fluid flow control device D is shown as a part of one basic form of liquid handling means for a beverage making and dispensing machine. For the purpose of this disclosure, the basic liquid handling means will be referred to as the beverage machine M.

The beverage machine M operates to receive water and beverage concentrate, to combine and mix predetermined volumes of water and concentrate and to discharge a finished beverage.

The beverage machine M illustrated first includes a manually operable water supply valve V that can be a part of a water supply system W or a part of the machine M, as desired or as circumstances require. The water supply system W is, for example, the municipal water supply system that delivers water at a constant and predetermined pressure of, for example, 45 psi. In practice, if the pressure afforded by the water supply system W is not constant, a pressure regulator (not shown) can be utilized to attain a stabilized pressure on the water delivered to the machine M, in accordance with common practices.

The valve V is shown connected with a water inlet port in the device D by a suitable water supply line.

The machine M next includes a liquid beverage concentrate supply C that is suitably connected with a liquid inlet opening in the device D. In the case illustrated, the liquid supply C includes an elongate vertically extending bottle-like container 20 with upper and lower ends. The container 20 carries a predetermined volumetric supply of liquid beverage concentrate (concentrate). The container 20 has a depending neck 21 at its lower end. The neck 21 is closed by a screw cap 22. The cap 22 has an elongate, tubular, depending dispensing spout 23. The lower end of the spout 23 carries an annular (O-ring) seal 24 about its exterior and is formed with an annular upwardly disposed annular valve seat 25 within its lower end portion. A check valve member 26 is positioned within the spout and is normally yieldingly urged downwardly and into seated engagement with the seat 25 by means of a spring 27. The seat 25, valve member 26 and spring 27 establish a check valve means that normally prevents concentrate in the container 20 from flowing out through the spout 23 when the container is not in use and is otherwise handled or moved about. The design of the check valves illustrated in the several views of the drawings has been changed to show some of the variations in designs that are likely to be encountered.

In addition to the above, the container 20 is formed with an air vent opening 28 at its upper end to admit air into the container and thereby allow the free flow of concentrate out of the container, through the spout.

The container 20 and its noted related parts (21 through 28) is a standard class of container that is widely used by the producers of beverage concentrates to package and distribute their products.

In practice, containers of the class described above are formed of a suitable plastic material and are provided in many different sizes and shapes.

In practice, the outlet ends of the spouts and the vent openings in the above class of containers are closed by adhesive seals (not shown). The seals are removed when the containers are put to use and the concentrate therein is to be dispensed through the spouts.

The dispensing device D includes check valve actuating means that engages and opens the check valve of a related container related to the device, as will hereinafter be described.

The machine M next includes a motor-driven pump P with inlet and outlet sides. The inlet side of the pump P is suitably connected with a liquid or concentrate outlet in the device D and operates to draw and move concentrate from the container 20 of the supply C, through the device D and to deliver that concentrate, from its outlet side. In practice, the pump P is a positive displacement pump and such that it moves the concentrate at a predetermined volumetric rate when operating.

In the case illustrated, the pump P is a diastolic pump having an elongate, tubular, flexible fluid conducting part 29 with elongate inlet and outlet end portions that project freely from a pump body 29' and that define the inlet and outlet sides of the pump. The pump P is such that the inlet and outlet ends of the part 29 can be advantageously connected directly with the parts of the machine from which it draws and to which it delivers the concentrate.

The machine M next includes a mixing unit U that receives metered volumes of water conducted through the device D and metered volumes of concentrate delivered by the pump P. The unit U mixes the water and concentrate together and delivers or discharges finished beverage.

In the case illustrated, the mixing unit U is an elongate vertical unit with an upper head portion 30 with water and concentrate inlet openings (not shown) and a downwardly extending and opening tubular beverage discharge tube 31. The concentrate inlet opening is shown connected with the outlet or downstream side of the pump part 29 by suitable coupling means, and the water inlet opening is connected with a water outlet port in the device D by means of a water delivery line 32. The mixing unit U can be related to any beverage receiving means. For example, the unit U can empty into a beverage holding tank; can be connected with a dispensing valve to facilitate filling beverage containers; or the like.

Figures 3, 4, 5, 6:
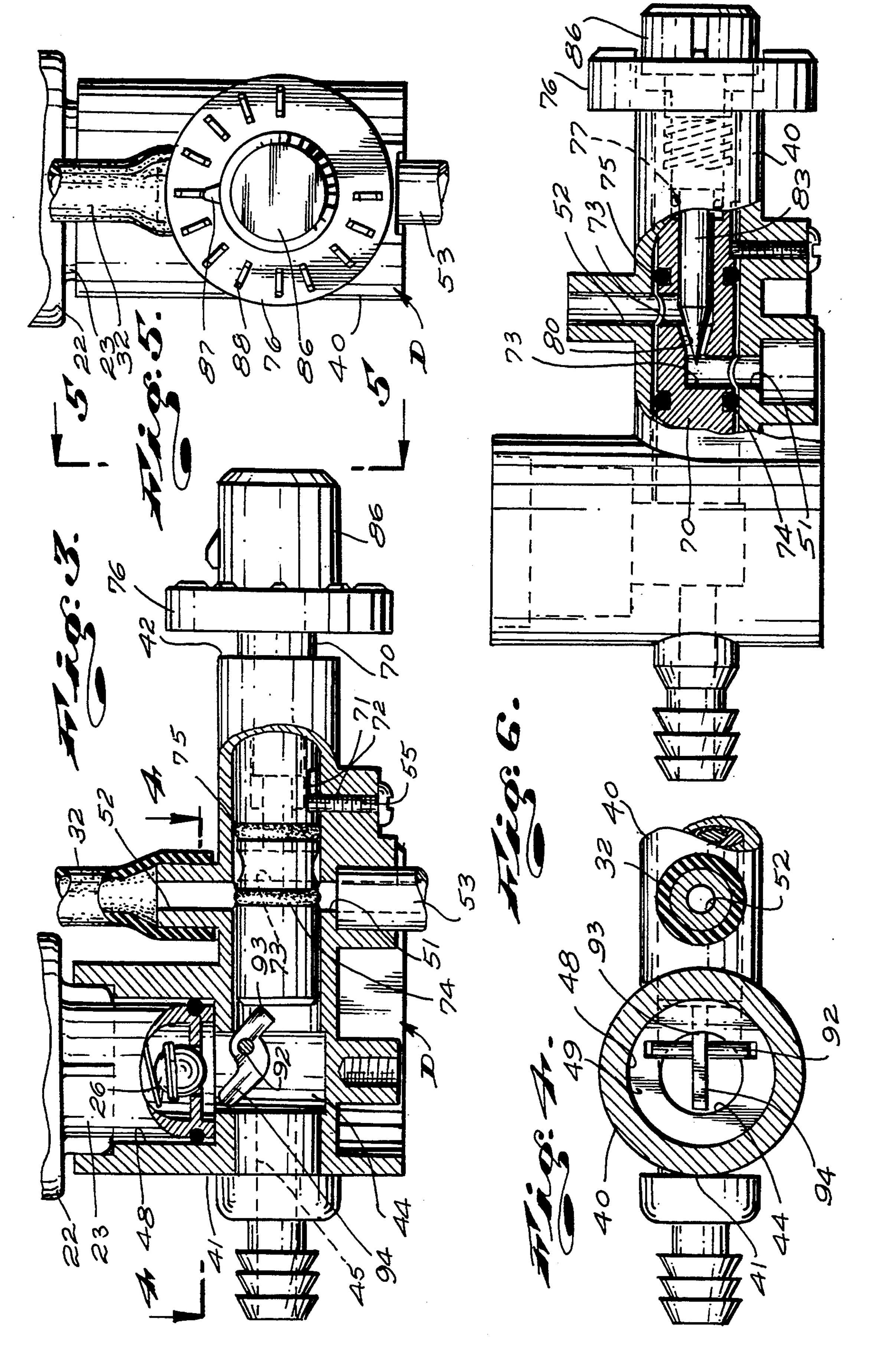
FIG. 3 is a view similar to FIG. 2 showing parts in different positions.
FIG. 4 is a view taken as indicated by Line 4—4 on FIG. 3.
FIG. 5 is a view taken as indicated by Line 5—5 on FIG. 3.
FIG. 6 is a view showing a modified form of the invention.

Referring to FIGS. 2 and 3 of the drawings, the multi-liquid flow control device D that we provide includes an elongate body 40 with front and rear ends 41 and 42, top and bottom sides and oppositely disposed lateral sides. The body 40 is formed with an elongate central bore opening 43. The bore opening enters the front end of the body and extends rearwardly therethrough where it connects with a liquid concentrate conducting chamber 44 formed in the rear end portion of the body.

The body 40 is formed with a liquid outlet opening 45 in its rear portion. The opening 45 is shown established by standard prong fitting 46 that is fitted in and made a part of the body. The fitting 46 is connected with the upstream end of the pump part 29.

The body 40 is next formed with a liquid inlet that communicates with the chamber 44. In the case illustrated, the liquid inlet opening is an upwardly opening cylindrical socket opening 48 entering the top side of the body. The socket opening 48 terminates in the body to define an upwardly opening annular stop shoulder 49. The inner peripheral edge of the shoulder 49 defines upper open end of the chamber 44 and defines the liquid inlet opening in the body.

The body next includes spaced water inlet and outlet ports 50 and 51 that enter sides of the body in the central portion thereof and that communicate with the bore opening 43. In practice, the ports 51 and 52 can be axially aligned and enter diametrically opposite sides of the body, as shown in FIG. 2 of the drawings; or, can be spaced apart longitudinally of the body, as shown in FIG. 6 of the drawings, as desired or as circumstances require.

The water inlet port 51 is shown connected with the valve V of the machine M of a line 53.

It is to be noted that the manner and means by which the several liquid openings and ports are connected with their related liquid handling means can be varied widely in form without in any way departing from the broader aspects and spirit of our invention. The several different coupling means that we have elected to illustrate in the drawings are illustrative of certain of those coupling means that might be advantageously employed when putting the device D to use.

Finally, the body 40 has a stop pin receiving opening 55 entering a side thereof forward of the ports therein as clearly shown in the drawings.

The socket opening 48 is formed to cooperatively receive and hold the depending, downwardly opening, tubular pouring spout 23 of the concentrate container 20 with which the device D is related. The check valve member 26 within the spout, at the lower open end thereof, is exposed to the interior of the chamber 44 in the body.

In practice, the body 40 is made of a suitable plastic material and is suitably shaped and/or contoured to enable its being molded of the plastic material in a most effective and efficient manner.

The device D next includes an elongate valve part 70. The valve part 70 is slidably entered into the bore 43 at the front end of the body and is manually shiftable axially within the bore and relative to the body between predetermined forward and rear positions.

Accurate positioning of the part 70 in its forward and rear positions can be effected by many different means. In the case illustrated, the part 70 is formed with an elongate longitudinally extending slot or flat 71 that defines front and rear stop shoulders and a stop pin 72 is engaged in and through the opening 55 in the body 40 and that enters into the slot.

In addition to limiting axial movement of the part 70, the slot and pin 71 and 72 serve to prevent turning or circumferential movement of the part 70 relative to the body 40.

The central portion of the part 70 is formed with an elongate water transfer passage 73 with radially opening upstream and downstream ends that move into and out of register with the water inlet and outlet ports 51 and 52 when the part 70 is moved longitudinally in the body between its rear and forward positions. That is, when the part 70 is in its rear position, the upstream and downstream ends of the passage are in register with the ports 51 and 52 and water entering the device through the port 51 flows through the passage and exits the device through the port 52, as shown in FIG. 2 of the drawings; and, when the part 70 is in its forward position, the ends of the passage are out of register with their related ports, as shown in FIG. 3 of the drawings, and the flow of water entering the port 51 is stopped from flowing through the passage to and out through the port 52.

In addition to the above, the part 70 carries annular front and rear seals (O-ring seals) 74 and 75 that are positioned forward and rearward of the passage 73 to seal between the part 70 and the bore opening 42.

When the part 70 is in its forward position, the rear seal 75 is moved forward of the rear-most portion of the water inlet port 51 and water flowing into and through the port 51 flows rearwardly in the bore opening and about the rear end of the part 70, and thence into the chamber 44. Thus, when the part 70 is in its forward position, water entering the device through port 51 is re-routed from flowing through the passage 73 and port 52 to flow rearwardly through the bore opening and into the chamber 44.

In the form of the invention now under consideration, it is desired that only a portion of the water entering the device D through the inlet port 51 be directed into the chamber 44 and that the remainder of the water continue to flow out through the port 52. To this end, the diameter of the part 70 is made smaller than the diameter of the bore 43 to establish a clearance or annulus between the part 70 and the bore through which water can flow, from the port 50 to the chamber 44. Further, the O-ring seal 75 carried by the part 70 is positioned so that when the part 70 is in its forward position the seal 75 occurs between the front and rear sides of the port 51, bridging the downstream end of that port to divide the volume of water entering the bore and allowing or causing a predetermined portion of the water to flow through the bore, about the part 70, forward of the seal 75 and out through the port 52 and the other portion thereof to flow rearwardly through the bore and about the part 70, into the chamber 44.

The above-noted splitting or dividing of the flow of water is provided for so that the volume and rate of water flowing into the chamber 44 is not so great that it will act upon the check valve member 26 of the concentrate container 20 and to cause the check valve to open when the part 70 is in its forward position. Thus, when the part 70 is in its forward position and water is directed to flow into and through the chamber 44, the water introduced into the chamber is not subject to unseating the check valve and entering the concentrate container where it would dilute the concentrate and hasten the growth of bacteria and spoilage of the concentrate within the container.

In the event that the clearance or annular space between the part 70 and the bore opening 43 is too restricted to allow for an adequate flow of water into the chamber 44, the rear portion of the part 70 (rearward of the seal 75) can be formed with a longitudinally extending flat (not shown) that establishes a flow channel of sufficient cross-section to afford desired flow of water between the part 70 and the bore opening.

In practice, if it is desired or necessary that the full flow of water entering the device be directed through the bore opening 43 and into the chamber 44 when the part 70 is in its forward position and that the flow of water through the device to the outlet port 52 thereof be sealed off, the water outlet port 51 is positioned in the body to occur forward of the water inlet port 50 and the passage 73 in the part 70 is formed so that it is downstream end is forward of its upstream end, as clearly shown in FIG. 6 of the drawings. In this modified embodiment of the invention, the rear seal 75 occurs rearward of the port 51 and seals between the part 70 and the bore opening 43 intermediate the ports 51 and 52, when the part 70 is in its forward position.

With the body 40 and the valve part 70 thus far described, it will apparent that a unique two-way valve structure is established. The two-way valve structure receives water from a related water supply and selectively directs the whole of that water through the device into a related water conducting line 32 or directs all or a portion of that water into the chamber 44 within the body and thence out of the body into a related fluid conducting part or means.

To effect axially shifting of the part 70 between its forward and rear positions in the body 40, the forward end of the part 70 is formed with a radially outwardly projecting, manually engageable operating handle 76. The handle 76 is shown in the form of an annular disk. In practice, the handle 76 can be such that it engages and stops against the forward end of the body 40 when the part 70 is in its rear position, thus supplementing or replacing the function of the stop pin 72 to stop the part 70 in its rear position.

In the preferred carrying out of our invention, the device D next includes metering valve means to meter the flow of water through the transfer passage 73 in the part 70 and thence out through the water outlet port 51.

When the metering valve means is included in the device D, the passage 73 in the part 70 is formed to establish a forwardly disposed valve seat 80 and an elongate longitudinally extending central opening 81 is formed in the part 70 to extend between the forward end thereof and the passage 73. The axes of the passage 73 and central opening 81 are at right angle to each other and are equal in diametric extent.

The central portion of the central opening is formed with an internal thread 82.

The metering valves next includes an elongate cylindrical valve stem 83 engaged in the opening 81. The stem 83 is formed with an external thread 84 that engages the thread 82. The rear end portion of the stem establishes or forms a valve member 85. The forward end portion of the stem extends forward from the part 70 and is formed with or carries a manually engageable knob 86.

The central portion of the opening 73 is larger in diameter than the rear portion of the stem 83 that extends into it, to define an annulus in which an O-ring seal 77 is engaged to seal between the stem and the part 70, as clearly shown in the drawings.

The valve part 85 is formed with a hemispherical rear end that will establish sealing seating engagement with a cylindrical side of the passage 73 that forms the valve seat 80, when the stem is rotated clockwise and threadedly advanced to a rear closed position.

Upon counter-rotation of the stem, the valve member is moved forwardly to any desired position within the passage 73 to effect metering of the flow of water through the passage, as desired or as circumstances require.

Finally, the knob 86 on the stem is provided with a pointer 87 and the handle 76 is formed with circumferentially spaced marks 88 to which the pointer 87 can be selectively directed.

The threads 82 and 83 are pitched so that upon less than one full rotation of the stem (270°), the valve part moves between a fully closed and fully open position. The marks 88 on the handle are spaced or calibrated with respect to the axial movement of the stem (when the stem is rotated) to facilitate moving and setting the valve part in different predetermined positions.

In FIG. 6 of the drawings, the metering valve means is modified to suit the different form of passage 73 in that modified form of our invention. As clearly illustrated, the seat 80 is a tapered seat and the valve part 85 is a needle valve.

It is to be noted that if the metering valve means is not required (in either embodiment of our invention), it can be eliminated. If the metering valve means is not to be included, the stem part is removed and the central opening in the part 70 is suitably plugged. Accordingly, a single valve part 70 can be advantageously used to produce devices embodying our invention that include or exclude the noted metering valve means.

Next, and finally, our new device D preferably includes check valve actuating means to cause the check valve in the spout 23 of the container 20 to open when the part 70 of the device is in its rear position and that allows the check valve to close when the part 70 is in its forward position.

The check valve actuating means is shown as including a bell crank 91 with an elongate horizontal axle 92 projecting from opposite sides thereof. The axle is on an axis normal to and positioned between the right angularly related axes of the part 70 and the discharge spout 23. The opposite ends of the axle 92 are engaged in laterally spaced upwardly opening bearing seats formed in the stop shoulder 49 at the bottom of the socket 48 in the body. The crank has a substantially downwardly extending first lever arm 93 that occurs at the rear end of the bore opening 43 and in working relationship with the rear end of the part 70. The crank next includes a rearwardly and upwardly extending second lever arm 94 that extends up into the spout 23 and into working relationship with the check valve member 26 of the check valve within the spout 23 of the container.

When the part 70 is moved to its rear position, it engages and pivots the first lever arm 93 of the crank rearwardly, causing the second lever arm 94 to pivot upwardly into engagement with and to move the valve member 26 up from its normal closed position to an open position.

When the part 70 is moved to its forward position, it disengages and allows the arm 93 to move forwardly and the arm 94 to move downwardly, allowing the valve member to be moved from its open position to its closed position by the spring 27 acting upon it.

With the check valve actuating means illustrated and described above, when the device D is engaged and put to use in a beverage machine such as the machine M shown in the drawings and described above, the part 70 is normally in its rear position in the body 40. When the spout of a related beverage concentrate container is engaged in the socket 48 in the body, the check valve actuating means opens the check valve in the spout and concentrate is free to flow down through the spout and into the chamber 44 of the body and thence out of the body into the inlet side of the pump P. The pump P delivers the concentrate moved thereby to the mixing unit U of the machine M.

When the device D is in its operating mode, a metered volume of water is caused to flow through the device and is delivered to the mixing unit U. The mixing unit U mixes the concentrate and water delivered to it and discharges a finished beverage.

When the machine is to be put out of service, the part 70 of the device D is moved to its forward position causing the check valve in the spout to close and to stop the flow of concentrate from the container into the chamber 44 of the device. At the same time, all or some of the water flowing into the device is directed into the chamber 44. The water entering the chamber works to flush and clean the chamber of concentrate and cleans the parts and/or portions of the spout and its check valve that are exposed to the chamber. The water is drawn from the chamber by the pump and flushes the pump of concentrate. The water discharged by the pump advances to and through the mixing unit U and flushes and cleans it of concentrate. The water dispensed from the mixing unit U flushes and cleans whatever means is provided downstream of the mixing unit to receive and handle the beverage discharged thereby.

When the water is let to flow through the device for a sufficient period of time to flush and clean the device and its related concentrate handling parts of the machine M of concentrate, the pump and water valve are turned off. When the machine and the device D are flushed and cleaned as noted above, the machine can be left to stand idle for a protracted period of time thereafter; it can be put back into service by simply turning on the water valve and the pump.

It is to be particularly noted that to effect cleaning and putting the device D and the machine M in which it is engaged out of service, and to put it back into service, the concentrate container C that is engaged with the device D need not be removed or in any way worked upon.

The potential use of our new device in conjunction with other kinds of concentrate supplies, such as "bag-n-box" type packaging means, is apparent. To enable such use of the device, without the need to redesign the whole of the device, adapters can be provided to effectively connect the device with any of the various kinds of concentrate supply means that are now in common use.

Figure 7:
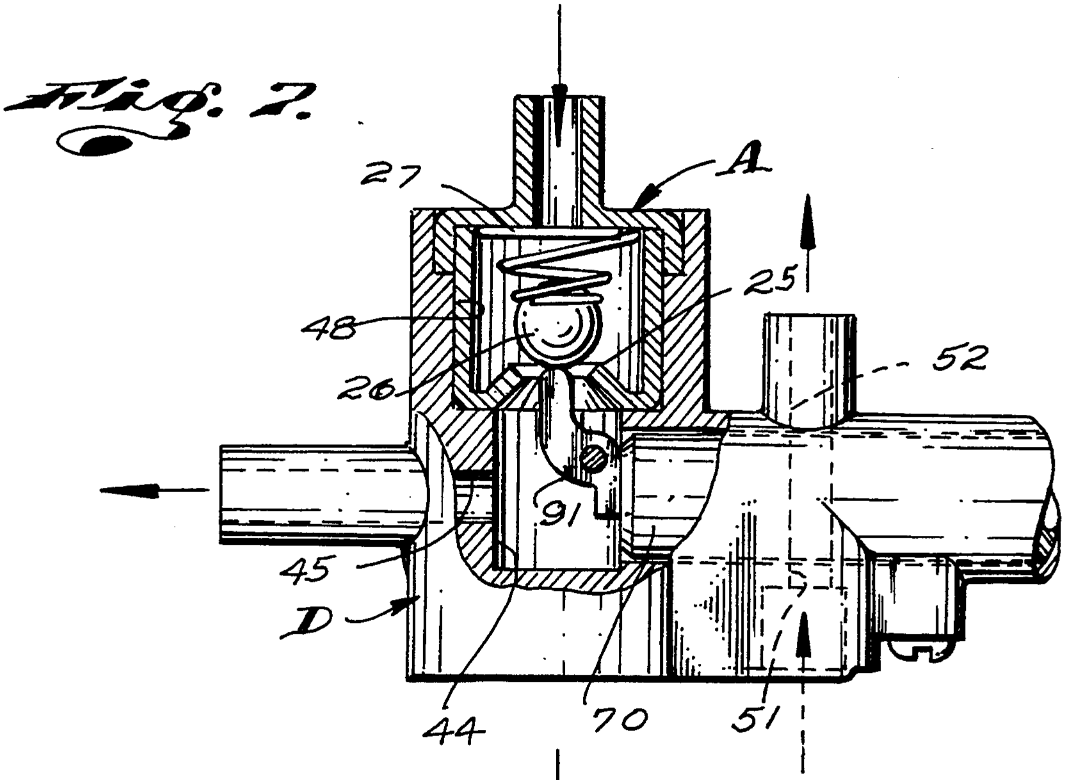
FIG. 7 is a view showing one form of adapter related to the device.

In FIG. 7 of the drawings, we have shown an adapter A with a check valve and an upwardly projecting fluid conducting nipple 90 with which a concentrate supply hose extending from a remote concentrate supply can be connected. The adapter A is similar in part with the spout 23 of the container 20 and is shown engageable in the socket 48 in the device D. With the adapter A, the device D can be advantageously and effectively connected with other and different forms of concentrate supply means, as by means of an intermediate fluid line (now shown).

Figure 8:
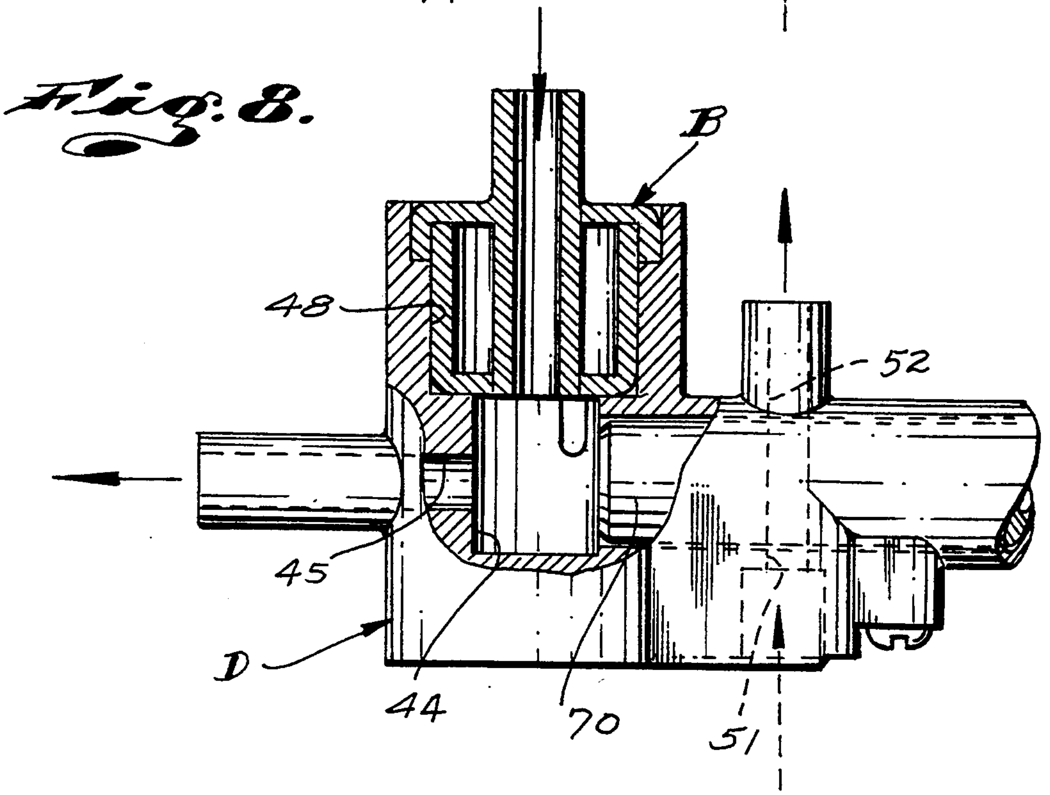
FIG. 8 is a view showing another form of adapter related to the device.

In FIG. 8 of the drawings, we have shown an adapter B that is similar in part with the adapter A shown in FIG. 7 but which does not include a check valve. When this second form of adapter is employed, the check valve actuating means of the device has no utility and can be eliminated by simply extracting the bell crank part from within the body.

When the adapters A and B are used, they can be cemented or otherwise fixed in the body to become integrated parts thereof.

With the adapters A and B shown in FIGS. 7 and 8 of the drawings, several different embodiments of our invention can be provided to meet the special needs of certain purchasers and users of our device without the need to produce and stock a multiplicity of different embodiments of the device.

Having illustrated and described typical preferred forms and embodiments of our invention, we do not wish to be limited to the specific details herein set forth but wish to reserve to ourselves any modifications and/or variations that might appear to those skilled in the art and that fall within the scope of the following claims.

Having described our invention, we claim:

1. A multi-fluid flow control device comprising an elongate body with front and rear ends, oppositely disposed upper and lower sides and oppositely disposed lateral sides, a liquid conducting chamber within the rear portion of the body, liquid inlet and outlet openings entering the exterior of the body and communicating with the chamber, means to connect the liquid inlet and outlet openings with liquid supply and delivery means, an elongate bore opening entering the front end of the body and communicating with the chamber, water inlet and outlet ports entering sides of the body and communicating with the bore opening between the ends thereof, means to connect the inlet and outlet ports with a water supply means and with a water delivery means, an elongate valve part with front and rear ends and a water transfer passage with upstream and downstream ends between its ends, front and rear seals carried by the valve part forward and rearward of the water transfer passage and sealing between the valve part and the bore opening, said valve part is shiftable longitudinally in the bore opening between a rear position where the rear seal is positioned in the bore opening between the chamber and the water inlet and outlet ports and the upstream and downstream ends of the passage are aligned with the inlet and outlet ports and a forward position where the ends of the passage are out of alignment with the water inlet and outlet ports and the rear seal is positioned forward of the water inlet port and communication is established between the water inlet port and the chamber through that portion of the bore opening between the inlet port and the chamber.

2. The multi-fluid flow control device set forth in claim 1 wherein the liquid inlet opening in the body is defined by an upwardly opening socket; a liquid supply including a container having a depending discharge spout entered into the socket opening and a normally closed check valve in the spout; and, a check valve actuating means including parts pivotally carried by the body and engageable with and between the check valve and the valve part and operating to move the check valve from its normal closed position to an open position when the valve part is in its rear position.

3. The multi-fluid flow control device set forth in claim 2 wherein the check valve includes a vertically moveable valve member accessible at the lower end of the spout, said check valve actuating means includes a crank pivotally carried by the body and including a first forwardly moveable arm engageable with the rear end of the valve part and a second upwardly moveable arm engageable with the valve member.

4. The multi-fluid flow control device set forth in claim 1 that further includes metering valve means to meter the flow of water flowing through the transfer passage, said metering valve means includes a valve seat in the transfer passage, an elongate central opening entering the forward end of the valve part and communicating with the transfer passage, an elongate valve stem with a central threaded portion threadedly engaged in the central opening and having a valve head at its rear end moveable longitudinally of the central opening and into and out of engagement in the passage and with the valve seat therein.

5. The multi-fluid flow control device set forth in claim 4 wherein the front end of the valve part has a radially outwardly projecting manually engageable handle forward of the front end of the body, and wherein the forward end of the stem has an operating knob that occurs forward of the handle.

6. The multi-fluid flow control device set forth in claim 5 that further includes an annular seal between the valve stem and the central opening forward of the transfer passage and valve head.

7. The multi-fluid flow control device set forth in claim 5 that further includes an annular seal between the valve stem and the central opening forward of the transfer passage and valve head; the liquid inlet opening in the body defines a socket opening; a liquid supply including a container having a discharge spout entered into the socket opening, a normally closed check valve in the spout; and, a check valve actuating means including parts pivotally carried by the body and engageable with and between the check valve and the valve part and operating to move the check valve from its normal closed position to an open position when the valve part is in its rear position.

8. The multi-fluid flow control device set forth in claim 5 that further includes an annular seal between the valve stem and the central opening forward of the transfer passage and valve head; the liquid inlet opening in the body defines a socket opening; a liquid supply including a container having an elongate discharge spout with an axially opening end portion entered into the socket opening and a normally closed check valve in the spout; and, a check valve actuating means including parts pivotally carried by the body and engageable with and between the check valve and the valve part and operating to move the check valve from its normal closed position to an open position when the valve part is in its rear position; the check valve includes a valve member movable axially within and accessible at the open end of the spout, said check valve actuating means includes a crank pivotally carried by the body and including a first forwardly and rearwardly moveable arm engageable with the rear end of the valve part and a second arm movable axially relative to the spout and engageable with the valve member.

* * * * *